US008009600B2

(12) United States Patent
Benveniste et al.

(10) Patent No.: US 8,009,600 B2
(45) Date of Patent: Aug. 30, 2011

(54) DEALING WITH LOST ACKNOWLEDGEMENTS WHEN POWER-SAVING

(75) Inventors: Mathilde Benveniste, South Orange, NJ (US); Srinivasa Rao Kocherla, Woburn, MA (US); Anjur Sundaresan Krishnakumar, Rocky Hill, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2042 days.

(21) Appl. No.: 10/769,448

(22) Filed: Jan. 30, 2004

(65) Prior Publication Data

US 2004/0223493 A1 Nov. 11, 2004

Related U.S. Application Data

(60) Provisional application No. 60/443,581, filed on Jan. 30, 2003.

(51) Int. Cl.
*G08C 17/00* (2006.01)
*H04M 1/00* (2006.01)
(52) U.S. Cl. .................................. 370/311; 455/574
(58) Field of Classification Search .............. 455/343, 455/574, 434; 370/338, 318, 311, 310
See application file for complete search history.

(56) References Cited

U.S. PATENT DOCUMENTS

| | | | | |
|---|---|---|---|---|
| 4,593,155 A * | 6/1986 | Hawkins | ..................... | 455/411 |
| 5,479,408 A * | 12/1995 | Will | .............................. | 370/313 |
| 5,748,100 A * | 5/1998 | Gutman et al. | ............... | 340/7.22 |
| 6,192,230 B1 * | 2/2001 | van Bokhorst et al. | .... | 455/343.3 |
| 6,243,365 B1 * | 6/2001 | Mansfield et al. | ............ | 370/310 |
| 6,330,436 B1 * | 12/2001 | Zidel | ........................ | 455/412.2 |
| 6,463,307 B1 * | 10/2002 | Larsson et al. | ................ | 455/574 |
| 7,117,000 B2 * | 10/2006 | Chen | .............................. | 455/515 |
| 7,133,374 B2 * | 11/2006 | Lo et al. | ......................... | 370/318 |
| 2002/0004902 A1 * | 1/2002 | Toh et al. | ....................... | 713/170 |
| 2002/0181415 A1 * | 12/2002 | West et al. | ..................... | 370/312 |
| 2003/0002449 A1 * | 1/2003 | Rittle et al. | ................... | 370/277 |
| 2003/0076859 A1 * | 4/2003 | Jiang | .............................. | 370/509 |
| 2003/0109270 A1 * | 6/2003 | Shorty | .......................... | 455/517 |
| 2003/0114204 A1 * | 6/2003 | Allen et al. | .................... | 455/574 |
| 2003/0126238 A1 * | 7/2003 | Kohno et al. | ................. | 709/220 |
| 2003/0147369 A1 * | 8/2003 | Singh et al. | ................... | 370/338 |
| 2003/0162554 A1 * | 8/2003 | Kim | .............................. | 455/466 |
| 2004/0008681 A1 * | 1/2004 | Govindarajan et al. | ....... | 370/394 |
| 2004/0038645 A1 * | 2/2004 | Rcunamaki et al. | ......... | 455/41.2 |
| 2004/0072588 A1 * | 4/2004 | Beach et al. | ............... | 455/550.1 |
| 2004/0081133 A1 * | 4/2004 | Smavatkul et al. | ........... | 370/346 |
| 2004/0114563 A1 * | 6/2004 | Shvodian | ...................... | 370/347 |
| 2004/0131019 A1 * | 7/2004 | Kandala | ......................... | 370/311 |
| 2004/0160906 A1 * | 8/2004 | Greszczuk et al. | ........... | 370/311 |

(Continued)

*Primary Examiner* — Christopher M Brandt
(74) *Attorney, Agent, or Firm* — Chapin IP Law, LLC; David W. Rouille, Esq.

(57) ABSTRACT

A novel method and apparatus for coping with lost acknowledgements from power-saving stations in local-area networks are disclosed. In particular, the illustrative embodiment modifies the access point's and power-saving stations' protocols to prevent repeated lost acknowledgements from occurring. An access point, after transmitting the final downlink frame of a sequence to a station and receiving an acknowledgement from the station, transmits a "double acknowledgement" to the station. A power-saving station, after receiving the final downlink frame of a sequence and transmitting an acknowledgement to the access point, stays awake until one of the following occur: (i) the station receives a double acknowledgement, (ii) the station observes a frame transmitted from the access point to another station, or (iii) the station observes that the shared-communications channel of the local-area network is idle for a particular time interval.

20 Claims, 6 Drawing Sheets

U.S. PATENT DOCUMENTS

2004/0203973 A1* 10/2004 Khan ............................ 455/517
2007/0116030 A1* 5/2007 Lundby ........................ 370/442
2009/0092069 A1* 4/2009 Rhee ............................ 370/311

* cited by examiner

DEALING WITH LOST ACKNOWLEDGEMENTS WHEN POWER-SAVING

REFERENCE TO RELATED APPLICATIONS

This application claims the benefit of:
1. U.S. provisional patent application Ser. No. 60/443,581, filed 30 Jan. 2003, entitled "Dealing With Loss Of Acknowledgements From Stations Operating In Power-Saving Mode In Wireless LANs," which is also incorporated by reference.

FIELD OF THE INVENTION

The present invention relates to telecommunications in general, and, more particularly, to wireless local area networks.

BACKGROUND OF THE INVENTION

FIG. 1 depicts a schematic diagram of an exemplary wireless local-area network (LAN) 100 in the prior art comprising access point 101 and stations 102-1 through 102-N, wherein N is a positive integer, interconnected as shown. Each station 102-$i$, wherein i is a member of the set $\{1, 2, \ldots N\}$, is a device such as a notebook computer, personal digital assistant (PDA), tablet PC, etc. that transmits radio signals to and receives radio signals from other stations in local-area network 100 via access point 101.

Access point 101 and stations 102-1 through 102-N transmit data in units referred to as frames over a shared-communications channel such that if two or more stations (or an access point and a station) transmit frames simultaneously, then one or more of the frames can become corrupted (resulting in a collision). As a result, local-area networks typically employ one or more protocols to ensure that a station or access point can gain exclusive access to the shared-communications channel for an interval of time in order to transmit its frames. Frames transmitted from a station 102-$i$ to access point 101 are referred to as uplink frames, and frames transmitted from access point 101 to a station 102-$i$ are referred to as downlink frames. In accordance with some protocols (e.g., Institute of Electrical and Electronics Engineers [IEEE] 802.11, etc.), when a station 102-$i$ receives a downlink frame from access point 101, the station transmits an acknowledgement back to access point 101 informing the access point that the downlink frame was successfully received. Similarly, when access point 101 receives an uplink frame from a station 102-$i$, the access point acknowledges receipt of the frame. Acknowledgements may be combined with data frames, the receipt of which must be acknowledged, too.

A station 102-$i$ can prolong its battery life by powering off its radio (or in general, its transceiver) when not transmitting or receiving. When a station powers off its radio, the station is said to enter a reduced-power state (also called the doze state). A station wakes up from the doze state by powering on its radio to enter the alert state. While a station is in the doze state, it cannot transmit or receive signals, and is said to be asleep. While a station is in the alert state, it can transmit or receive signals; the time interval that a station is known to the access point to be in the alert state is said to be the awake period. A station that conserves battery life by alternating between alert and doze states is said to be in power-save mode, and a station that employs power-save mode is said to be a power-saving station.

Problems can arise, however, when power-saving stations enter the doze state. Typically, the protocol enables the station to know whether additional frames will be transmitted to the power-saving station in the alert state before it goes back to sleep. There are several ways for a power saving station to know that a frame is the last frame to be sent by the access point before it wakes up again. For example, according to the IEEE 802.11-1999 protocol, a power-saving station, which sends a frame known as the PS-Poll to notify the access point that it is awake, will receive a single downlink frame from the access point. In another example, a power-saving station that follows the IEEE 802.11e proposed power-saving mechanisms will be notified that a downlink frame is the last frame received in its awake period by the access point setting a special bit in the control field of that frame to 1.

Once a station has received the last frames destined for it, it may enter the reduced-power state. However, a problem can arise when a power-saving station, after receiving the last downlink frame, transmits an acknowledgement to the access point and subsequently enters the doze state. In particular, in accordance with some protocols, if the acknowledgement is "lost" (i.e., the access point doesn't receive the acknowledgement [e.g., due to RF interference, etc.]), then the access point re-transmits the frame to the power-saving station and waits again for an acknowledgement. Because the power-saving station is in the doze state, however, the station does not receive the re-transmitted frame, and therefore does not transmit an acknowledgement to the access point, thereby resulting again in a lost acknowledgement, which causes the access point to re-transmit the frame, etc. The retransmissions repeat indefinitely or until a pre-specified limit on retransmissions is exhausted. The occurrence of such "repeated" lost acknowledgements causes, at the very least, a waste of bandwidth, and potentially, depending on the protocol, a significant increase in delay, jitter, etc. for other stations in the local-area network.

SUMMARY OF THE INVENTION

The present invention addresses the problem of lost acknowledgements in local-area networks with power-saving stations. In particular, the illustrative embodiment modifies the access point's and power-saving stations' protocols in order to prevent repeated lost acknowledgements from occurring as a consequence of losing the acknowledgement to the final downlink frame of a sequence of one or more downlink frames.

In the illustrative embodiment of the present invention, an access point, after transmitting a downlink frame f to a station, does one of two things:

if frame f was the last frame in the sequence of frames to transmit to the station, the access point transmits a "double acknowledgement" to the station (i.e., a frame that acknowledges that the station's acknowledgement was received, and does not normally require an acknowledgement), otherwise, the access point transmits the next frame in the sequence to the station, in normal fashion.

A power-saving station, knowing that a received downlink frame is the last downlink frame the access point will send to the station until the station wakes up again, transmits its acknowledgement and waits until one of the following occur before entering the doze state:

(i) the station receives a double acknowledgement,
(ii) the station, listening to the shared-communications channel, observes a frame transmitted from the access point to another station, or (iii) the station, listening to the shared-communications channel, observes that the channel has been idle for a particular time interval (e.g., the Point Coordination Function InterFrame Spacing [PIFS] for an IEEE 802.11 network, etc.).

Once any of these three situations occur, the power-saving station enters the doze state. Thus, a power-saving station does not enter the doze state until the station knows that the access point presently will not be sending any more frames to the station.

For the purposes of this specification, the statement that a frame f is the "final frame in a sequence of one or more frames" transmitted to a station comprises:
(i) the case in which the access point has no more frames buffered for the station, and
(ii) the case in which the access point has insufficient time remaining to transmit additional frames to the station (e.g., the access point proceeds to poll another station in its polling list, the access point transmit frames to another station, etc.), and
(iii) the case in which the access point has no further downlink transmissions planned for a specified time interval, and The illustrative embodiment comprises: (a) receiving a final frame of a sequence of one or more frames; (b) transmitting to the sender of said final frame an acknowledgement that acknowledges said first frame; (c) receiving from the sender of said final frame a frame that acknowledges said acknowledgement; and (d) entering, after (c), a reduced-power state.

DETAILED DESCRIPTION

Figure 1:
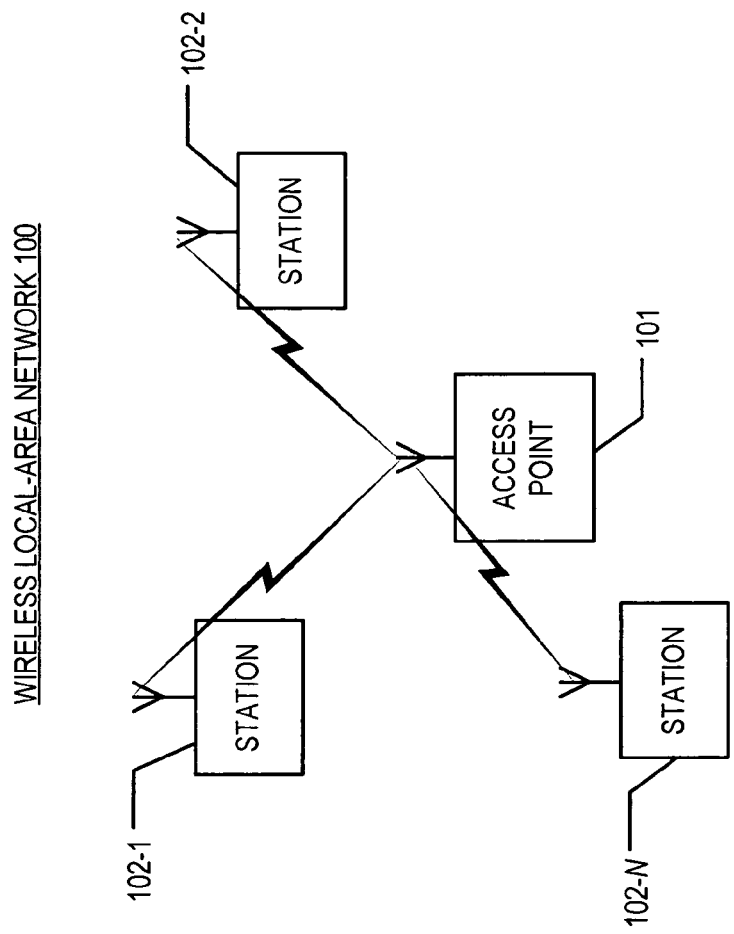
FIG. 1 depicts a schematic diagram of an exemplary wireless local-area network 100 in the prior art.
Figure 2:
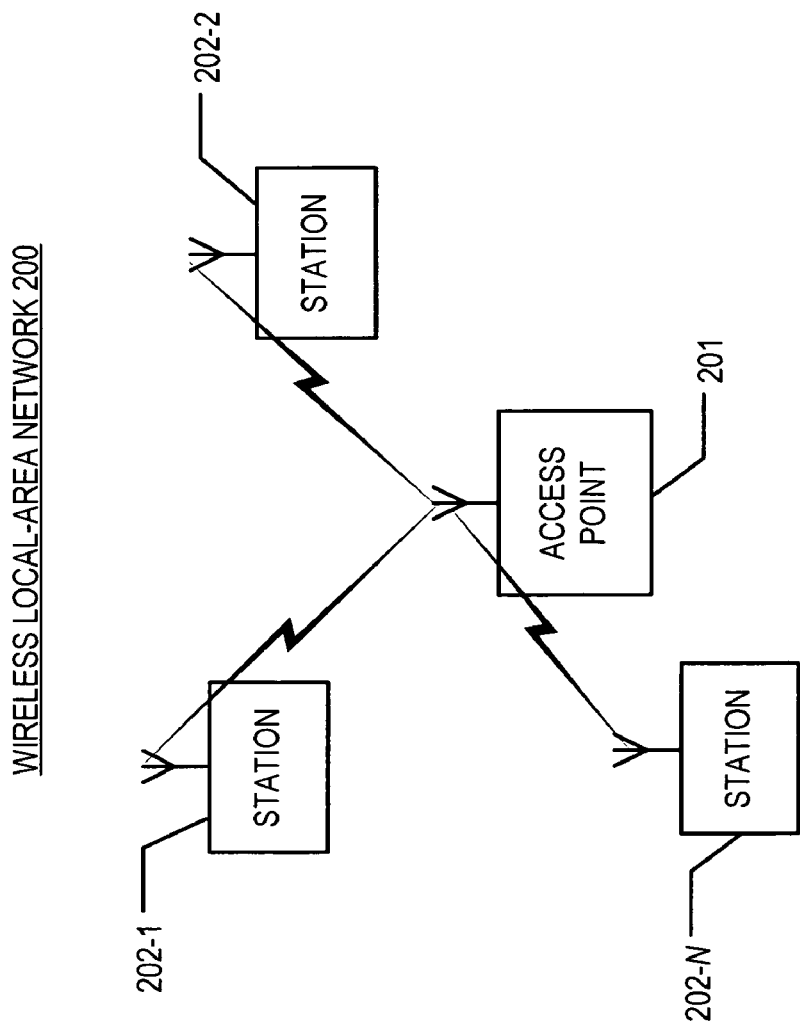
FIG. 2 depicts a schematic diagram of a portion of local-area network 200 in accordance with the illustrative embodiment of the present invention.

FIG. 2 depicts a schematic diagram of local-area network 200 in accordance with the illustrative embodiment of the present invention. Local-area network 200 comprises access point 201, and stations 202-1 through 202-N, interconnected as shown. At least one station 202-i in local-area network 200 is a power-saving station, where i is an integer in set $\{1, \ldots N\}$.

Access point 201 is capable of receiving frames from stations 202-1 through 202-N via a shared-communications channel, and of transmitting frames to stations 202-1 through 202-N via the shared-communications channel as described below and with respect to FIG. 5.

Power-saving station 202-i is capable of (i) generating frames, (ii) transmitting frames over a shared-communications channel to access point 201, (iii) receiving frames from the shared-communications channel, and (iv) transitioning from an alert state to a doze state as described below and with respect to FIG. 6.

Figure 3:
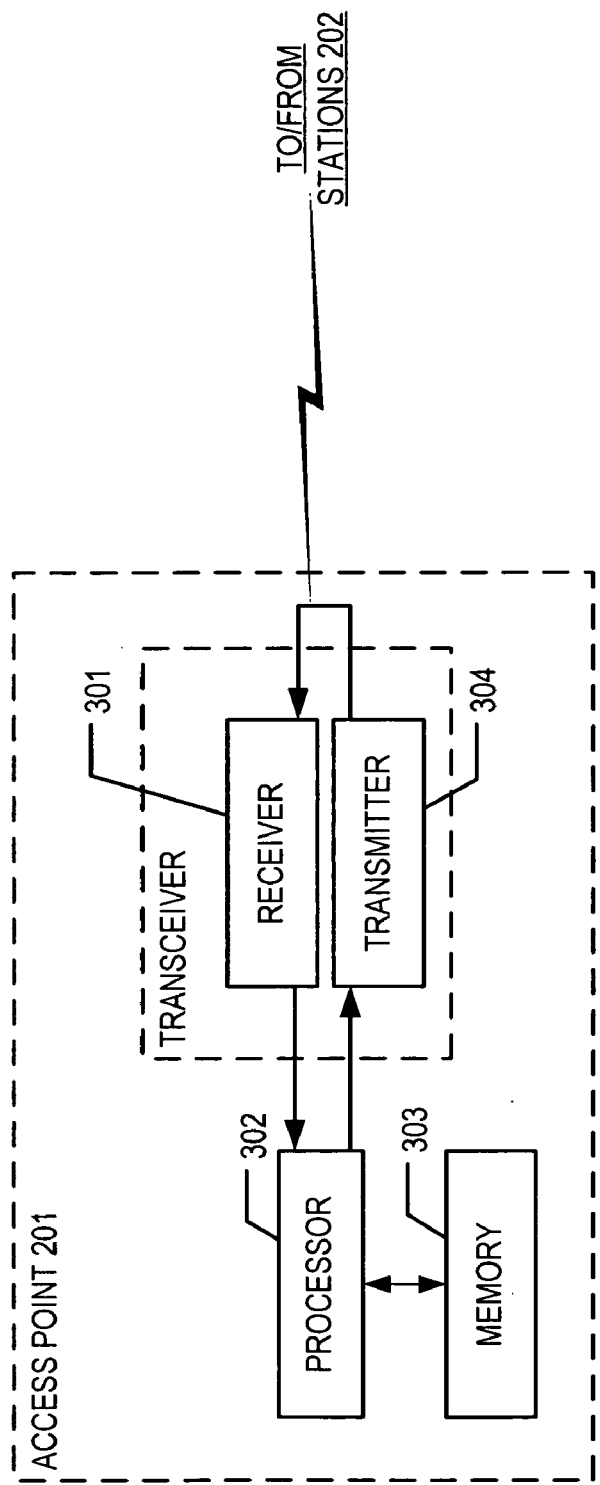
FIG. 3 depicts a block diagram of the salient components of access point 201, as shown in FIG. 2, in accordance with the illustrative embodiment of the present invention.

FIG. 3 depicts a block diagram of the salient components of access point 201 in accordance with the illustrative embodiment of the present invention. Access point 201 comprises receiver 301, processor 302, memory 303, and transmitter 304, interconnected as shown. Although in the illustrative embodiment receiver 301 and transmitter 304 make up an integrated transceiver (e.g., a two-way radio, etc.), as shown in FIG. 3, it will be appreciated by those skilled in the art that in some embodiments receiver 301 and transmitter 304 might be logically integrated, rather than physically integrated.

Receiver 301 is a circuit that is capable of receiving frames from shared communications channel 203, in well-known fashion, and of forwarding them to processor 302. It will be clear to those skilled in the art how to make and use receiver 301.

Processor 302 is a general-purpose processor that is capable of executing instructions stored in memory 303, of reading data from and writing data into memory 303, and of executing the tasks described below and with respect to FIG. 5. In some alternative embodiments of the present invention, processor 302 might be a special-purpose processor (e.g., a network processor, etc.). In either case, it will be clear to those skilled in the art, after reading this disclosure, how to make and use processor 302.

Memory 303 is capable of storing programs and data used by processor 302, as is well-known in the art, and might be any combination of random-access memory (RAM), flash memory, disk drive, etc. It will be clear to those skilled in the art, after reading this specification, how to make and use memory 303.

Transmitter 304 is a circuit that is capable of receiving frames from processor 302, in well-known fashion, and of transmitting them on shared communications channel 203. It will be clear to those skilled in the art how to make and use transmitter 304.

Figure 4:
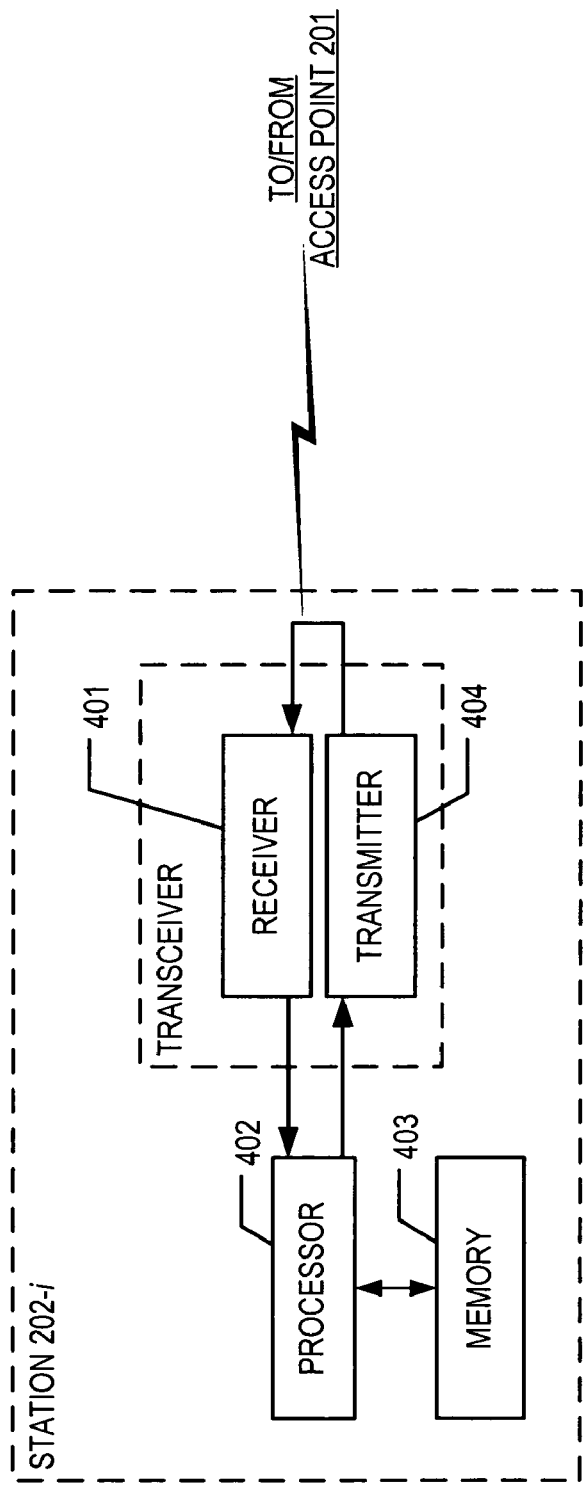
FIG. 4 depicts a block diagram of the salient components of station 202-i, as shown in FIG. 2, in accordance with the illustrative embodiment of the present invention.

FIG. 4 depicts a block diagram of the salient components of station 202-i, in accordance with the illustrative embodiment of the present invention. Station 202-i comprises receiver 401, processor 402, memory 403, and transmitter 404, interconnected as shown. Although in the illustrative embodiment receiver 401 and transmitter 404 make up an integrated transceiver (e.g., a two-way radio, etc.), as shown in FIG. 4, it will be appreciated by those skilled in the art that in some embodiments receiver 401 and transmitter 404 might be logically integrated, rather than physically integrated.

Receiver 401 is a circuit that is capable of receiving frames from shared-communications channel 203, in well-known fashion, and of forwarding them to processor 402. Receiver 401 is also capable of being powered off for a doze state. It will be clear to those skilled in the art how to make and use receiver 401.

Processor 402 is a general-purpose processor that is capable of executing instructions stored in memory 403, of reading data from and writing data into memory 403, of outputting signals to receiver 401 and transmitter 404 to transition between an alert state and a doze state, and of executing the tasks described below and with respect to FIG. 6. In some alternative embodiments of the present invention, processor 402 is a special-purpose processor (e.g., a network processor, etc.). In either case, processor 402 contains one or more logic circuits, as is well known in the art, and it will be clear to those skilled in the art after reading this disclosure how to make and use processor 402.

Memory 403 is capable of storing programs and data used by processor 402, as is well-known in the art, and might be any combination of random-access memory (RAM), flash memory, disk drive, etc. It will be clear to those skilled in the art, after reading this specification, how to make and use memory 403.

Transmitter 404 is a circuit that is capable of receiving frames from processor 402, in well-known fashion, and of transmitting them on shared communications channel 203. Transmitter 404 is also capable of being powered off for a doze state. It will be clear to those skilled in the art how to make and use transmitter 404.

In the illustrative embodiment of the present invention, access point 201 and stations 202-1 through 202-N support at least one IEEE 802.11 protocol. In alternative embodiments of the present invention, access point 201 and stations 202-1 through 202-N might support other protocols in lieu of, or in addition to, one or more IEEE 802.11 protocols. Furthermore, in some embodiments of the present invention local-area network 200 might comprise an alternative shared-communications channel (for example, wireline instead of wireless). In all such cases, it will be clear to those skilled in the art after reading this specification how to make and use access point 201 and stations 202-1 through 202-N.

Figure 5:
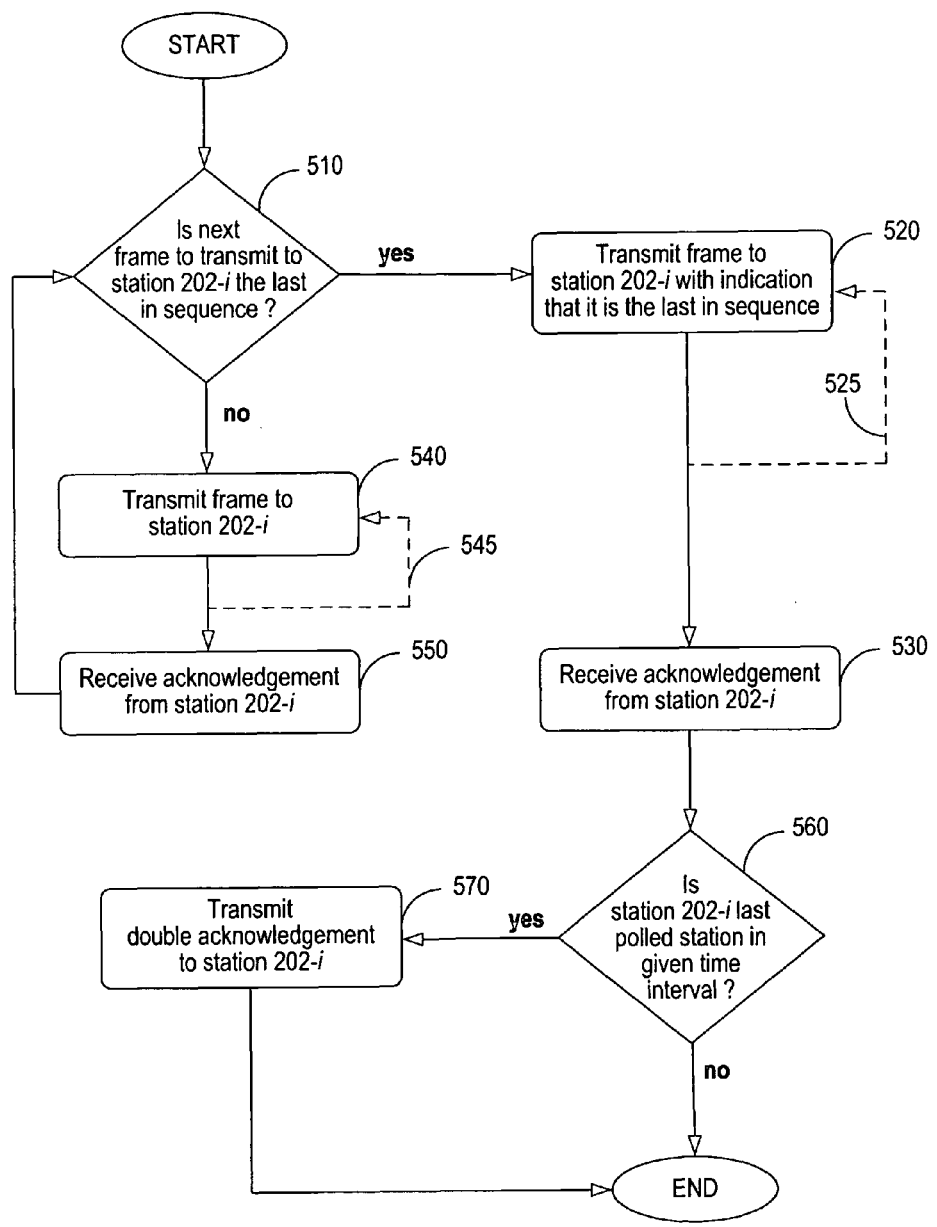
FIG. 5 depicts a flowchart for access point 201, as shown in FIG. 2, for transmitting one or more frames to station 202-i, as shown in FIG. 2, in accordance with the illustrative embodiment of the present invention.

FIG. 5 depicts a flowchart for access point 201 for transmitting a sequence of one or more frames to station 202-i, in accordance with the illustrative embodiment of the present invention. It will be clear to those skilled in the art which tasks depicted in FIG. 5 can be performed simultaneously or in a different order than that depicted.

At task 510, access point 201 checks whether the next frame to transmit to station 202-i is the last frame in the sequence. (As described above, a frame is the last frame in the sequence if either (i) access point 201's downlink buffer for station 202-i is empty, or (ii) access point 201 has insufficient time to transmit at least one more frame in the buffer.) If the frame is the last frame in the sequence, execution proceeds to task 520, otherwise execution continues at task 540.

At task 520, access point 201 transmits the frame to station 202-i with an indication that it is the last frame in the sequence (e.g., by setting a 'More Data' bit to 0, by setting the EOSP in an 802.11 frame to 1, etc.)

At task 530, access point 201 receives an acknowledgement from station 202-i via the shared-communications channel in well-known fashion. As indicated by dotted line 525 in FIG. 5, if station 202-i does not receive the acknowledgement (e.g., due to RF interference, etc.), then execution goes back to task 520 in accordance with the protocol of the prior art, in well-known fashion. As will be demonstrated in the description of FIG. 6 below, the problem of repeated lost acknowledgements due to a power-saving station entering the doze state will not occur in the illustrative embodiment. After task 530, execution proceeds to task 560.

At task 540, access point 201 transmits the frame to station 202-i via the shared-communications channel in normal fashion. The first time task 540 is executed, the first frame in the sequence is transmitted; the second time task 540 is executed, the second frame in the sequence is transmitted; etc.

At task 550, access point 201 receives an acknowledgement from station 202-i via the shared-communications channel in well-known fashion. As indicated by dotted line 545, if station 202-i does not receive the acknowledgement (e.g., due to RF interference, etc.), then execution goes back to task 540 in accordance with the protocol of the prior art, in well-known fashion. After task 550, execution continues back at task 510.

At task 560, access point 201 checks whether station 202-i is the last polled station during a contention-free period (e.g., an IEEE 802.11 Controlled Access Period [CAP], etc.). If so, execution proceeds to task 570, otherwise the method of FIG. 5 terminates.

At task 570, access point 201 transmits a double acknowledgement to station 202-i (i.e., a frame that acknowledges that station 202-i's acknowledgement was received) via the shared-communications channel in well-known fashion. As will be appreciated by those skilled in the art, in some embodiments the double acknowledgement frame might have the same format as a regular acknowledgement of the particular protocol, while in some other embodiments the double acknowledgement frame might have some other format.

After task 570, the method of FIG. 5 terminates.

Figure 6:
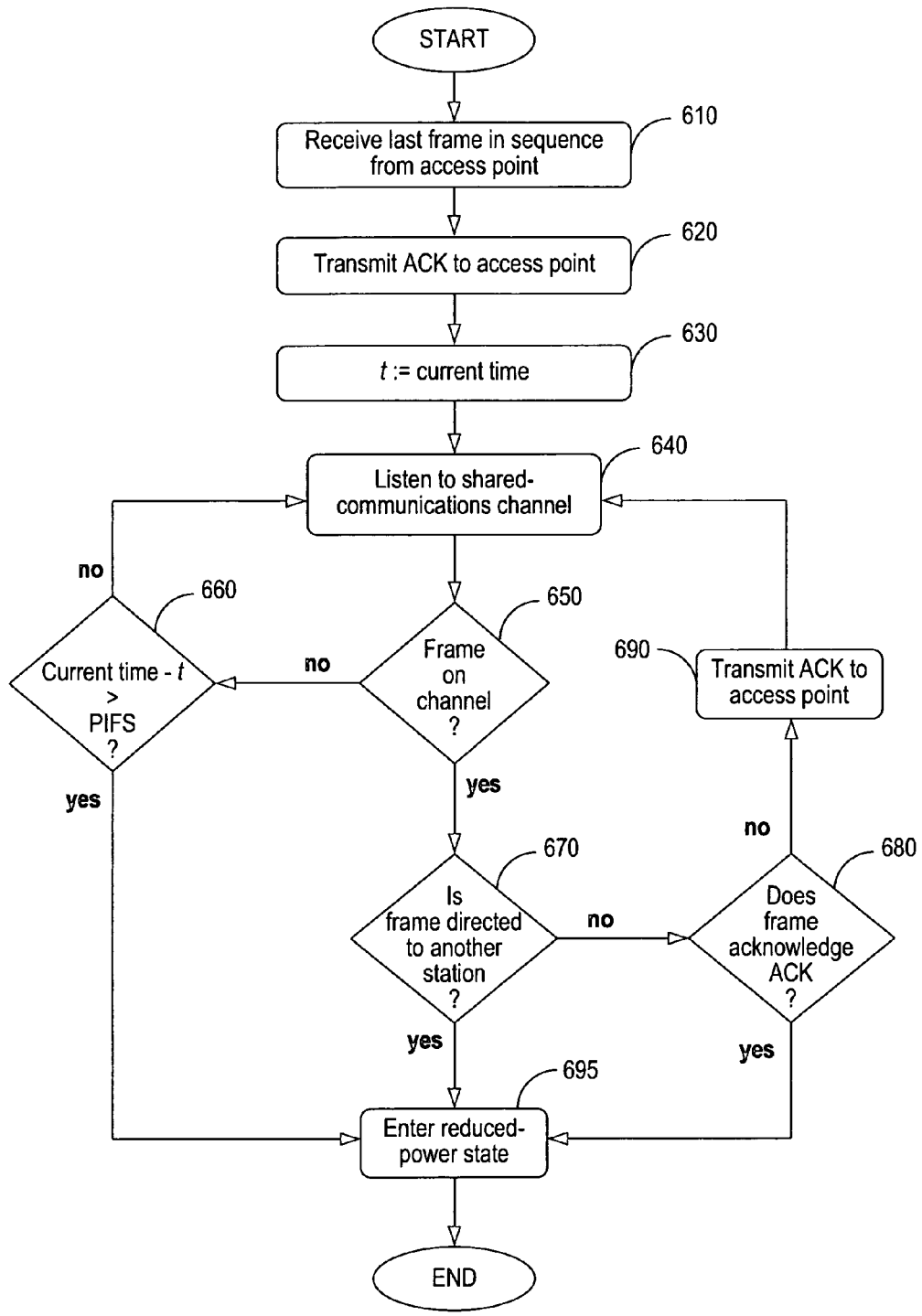
FIG. 6 depicts a flowchart for power-saving station 202-i, as shown in FIG. 2, for determining when to enter a reduced-power state, in accordance with the illustrative embodiment of the present invention.

FIG. 6 depicts a flowchart for power-saving station 202-i for determining when to enter a reduced-power state, in accordance with the illustrative embodiment of the present invention. It will be clear to those skilled in the art which tasks depicted in FIG. 6 can be performed simultaneously or in a different order than that depicted.

At task 610, station 202-i receives the last frame in a sequence from access point 201 via the shared-communications channel. As described above, there are a variety of ways in which to indicate that a frame is the last in a sequence (e.g., by setting a 'More Data' bit to 0, by setting the EOSP in an 802.11 frame to 1, etc.).

At task 620, station 202-i transmits an acknowledgement to access point 201 via the shared-communications channel in well-known fashion.

At task 630, station 202-i stores the current time in variable t.

At task 640, station 202-i listens to the shared-communications channel in well-known fashion.

At task 650, station 202-i checks whether there is a frame on the shared-communications channel; if not, execution proceeds to task 660, otherwise execution continues at task 670.

At task 660, station 202-i checks whether the difference between the current time and time t exceeds the Point Coordination Function InterFrame Spacing (PIFS) time interval. If so, which indicates that the shared-communications channel has been idle for more than the PIFS, and therefore that access point 201 has no more frames to transmit to station 202-i, execution proceeds to task 695, otherwise execution continues back at task 640.

At task 670, station 202-i checks whether the frame observed at task 650 is directed to a station other than station 202-i; if so, execution proceeds to task 695, otherwise, execution proceeds to task 680.

At task 680, station 202-i checks whether the frame (which was directed to station 202-i) is a double acknowledgement (i.e., whether the frame acknowledges an acknowledgement that station 202-i transmitted at either task 620 above or task 690 below); if so, execution proceeds to task 695, otherwise, execution proceeds to task 690.

At task 690, station 202-i transmits an acknowledgement to access point 201 that acknowledges the frame received at task 650 (which is a "regular" downlink frame, not a double acknowledgement). After task 690, execution continues back at task 640.

At task 695, station 202-i enters a reduced-power state (i.e., processor 402 outputs a signal that causes receiver 401 and transmitter 404 to power off), in well-known fashion.

After task 695, the method of FIG. 6 terminates.

Although the illustrative embodiment of the present invention is disclosed in the context of IEEE 802.11 local-area networks, it will be clear to those skilled in the art after reading this specification how to make and use embodiments of the present invention for other kinds of networks and network protocols.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising steps of:
   (a) receiving, from a sender in a network, a final frame of a sequence of multiple frames;
   (b) transmitting, to the sender of said final frame, a first acknowledgement that acknowledges receipt of said final frame from the sender;
   (c) receiving from the sender of said final frame a second acknowledgement, the second acknowledgement indicating receipt of the first acknowledgement by the sender; and
   (d) entering, after receiving the second acknowledgment in (c), a reduced-power state.

2. The method of claim 1 wherein (a), (b), and (c) are via a shared-communications channel.

3. The method of claim 1 wherein said first acknowledgement that acknowledges said final frame is in a first protocol and wherein said second acknowledgement that acknowledges said first acknowledgement is in a second protocol.

4. The method as in claim 1 further comprising:
   between step (b) and step (c):
      storing a value indicative a current time value;
      monitoring an amount of time passing since storing the value; and
      comparing the amount of time to a threshold value.

5. The method as in claim 1 further comprising:
   between step (b) and step (c):
      receiving an additional frame from the sender after receiving the final frame;
      checking whether the additional frame is directed to a different station than a station receiving the final frame; and
      detecting that the additional frame from the sender includes the second acknowledgement.

6. The method as in claim 1 further comprising:
   between step (b) and step (c):
      receiving an additional frame from the sender on a shared communication channel after receiving the final frame; and
      in response to detecting that the additional frame from the sender is a regular down link frame from the sender and not the second acknowledgement, monitoring the shared communication channel for more frames in lieu of entering the reduced-power state.

7. The method of claim 6, wherein said first acknowledgement that acknowledges said final frame is transmitted in accordance with a first protocol and wherein said second acknowledgement is referenced in accordance with a second protocol.

8. The method of claim 1, wherein entering the reduced-power state occurs in response to receiving the second acknowledgement from the sender.

9. A method comprising:
   (a) transmitting to a station a frame f in a sequence of one or more frames;
   (b) receiving from said station a first acknowledgement that acknowledges said frame f;
   (c) transmitting to said station, after (b), a second acknowledgement that acknowledges said first acknowledgement when (i) said frame f is the final frame of said sequence, and (ii) said station is the last polled station during a contention-free period; and
   (d) transmitting to said station, after (b), the frame following said frame f in said sequence when said frame f precedes the final frame of said sequence.

10. The method of claim 9 wherein said first acknowledgement that acknowledges said final frame is in a first protocol and wherein said second acknowledgement that acknowledges said first acknowledgement is in a second protocol.

11. A method comprising:
   (a) receiving a final frame of a sequence of one or more frames via a shared-communications channel;
   (b) transmitting via said shared-communications channel a first acknowledgement to the sender of said final frame, wherein said first acknowledgement acknowledges said final frame;
   (c) listening, after (b), to said shared-communications channel for a second acknowledgement; and
   (d) entering a reduced-power state when said second acknowledgement acknowledges said first acknowledgement.

12. The method of claim 11 further comprising:
   (e) entering said reduced-power state when said second acknowledgement is directed to another party.

13. The method of claim 11 further comprising:
   (f) entering said reduced-power state when, during (c), said shared-communications channel is idle for a time interval.

14. The method of claim 11 wherein said first acknowledgement that acknowledges said final frame is in a first protocol and wherein said second acknowledgement that acknowledges said first acknowledgement is in a second protocol.

15. An apparatus comprising:
   a transceiver for:
      receiving a final frame of a sequence of one or more frames,
      transmitting to the sender of said final frame a first acknowledgement that acknowledges receipt of said final frame, and
      receiving, from the sender of said final frame, a second acknowledgement that acknowledges receipt of said first acknowledgement by the sender; and
   a logic circuit for outputting, after said transceiver receives said second acknowledgement, a signal that causes said transceiver to enter a reduced-power state.

16. The apparatus of claim 15 wherein said transceiver transmits and receives via a shared-communications channel.

17. An apparatus comprising:
   a transmitter for transmitting to a station a frame f of a sequence of one or more frames;
   a receiver for receiving from said station a first acknowledgement that acknowledges said frame f; and
   a logic circuit for:
      outputting, when said frame f is the final frame of said sequence and said station is the last polled station during a contention-free period, a signal that causes said transmitter to transmit a second acknowledgement that acknowledges said first acknowledgement, and outputting, when said frame f precedes the final frame of said sequence, a signal that causes said transmitter to transmit the second acknowledgement following said frame f in said sequence.

18. An apparatus comprising:

a transceiver for:

receiving a final frame of a sequence of one or more frames via a shared-communications channel, transmitting to the sender of said final frame, via said shared-communications channel, a first acknowledgement that acknowledges said final frame, and listening, after transmitting said first acknowledgement, to said shared-communications channel for a second acknowledgement; and a logic circuit for outputting, when said second acknowledgement acknowledges said first acknowledgement, a signal that causes said transceiver to enter a reduced-power state.

19. The apparatus of claim 18 wherein said logic circuit is also for outputting said signal when said second acknowledgement is directed to another party.

20. The apparatus of claim 18 wherein said logic circuit is also for outputting said signal when, after said transceiver transmits said first acknowledgement, said shared-communications channel is idle for a time interval.

* * * * *